United States Patent
Natanzon et al.

(10) Patent No.: US 9,032,160 B1
(45) Date of Patent: May 12, 2015

(54) CONTINUOUS DATA REPLICATION

(75) Inventors: Assaf Natanzon, Tel Aviv (IL); Saar Cohen, Mishmeret (IL); Steven R. Bromling, Alberta (CA)

(73) Assignee: EMC Corporation, Hopkinton, MA (US)

( * ) Notice: Subject to any disclaimer, the term of this patent is extended or adjusted under 35 U.S.C. 154(b) by 242 days.

(21) Appl. No.: 13/339,780

(22) Filed: Dec. 29, 2011

(51) Int. Cl.
*G06F 12/08* (2006.01)
*G06F 11/34* (2006.01)
*G06F 1/24* (2006.01)
*G06F 11/07* (2006.01)

(52) U.S. Cl.
CPC ............... *G06F 11/073* (2013.01); *G06F 1/24* (2013.01)

(58) Field of Classification Search
CPC . G06F 3/067; G06F 11/1484; G06F 9/45533; G06F 2009/4557; G06F 3/0647; G06F 12/109; G06F 2201/84; G06F 3/0662; G06F 17/30235; G06F 2201/815; G06F 2212/152
See application file for complete search history.

(56) References Cited

U.S. PATENT DOCUMENTS

| | | | |
|---|---|---|---|
| 2007/0050538 A1* | 3/2007 | Northcutt et al. | 711/112 |
| 2008/0082770 A1* | 4/2008 | Ahal et al. | 711/162 |
| 2012/0054367 A1* | 3/2012 | Ramakrishnan et al. | 709/242 |
| 2012/0102268 A1* | 4/2012 | Smith et al. | 711/113 |
| 2013/0086298 A1* | 4/2013 | Alanis et al. | 711/6 |

* cited by examiner

*Primary Examiner* — Matthew Bradley
*Assistant Examiner* — Candice Rankin
(74) *Attorney, Agent, or Firm* — Krishnendu Gupta; Joseph D'Angelo

(57) ABSTRACT

In a first embodiment, a method and computer program product for use in a storage system comprising quiescing IO commands the sites of an ACTIVE/ACTIVE storage system, the active/active storage system having at least two storage sites communicatively coupled via a virtualization layer, creating a change set, unquiescing IO commands by the virtualization layers, transferring data of a change set to the other sites of the active/active storage system by the virtualization layer, and flushing the data by the virtualization layer.

In a second embodiment, a method and computer program product for use in a storage system comprising fracturing a cluster of an active/active storage system; wherein the cluster includes at least two sites, stopping IO on a first site of the cluster; and rolling to a point in time on the first site.

20 Claims, 10 Drawing Sheets

CONTINUOUS DATA REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In a first embodiment, a method and computer program product for use in a storage system comprising quiescing IO commands the sites of an ACTIVE/ACTIVE storage system, the active/active storage system having at least two storage sites communicatively coupled via a virtualization layer, creating a change set, unquiescing IO commands by the virtualization layers, transferring data of a change set to the other sites of the active/active storage system by the virtualization layer, and flushing the data by the virtualization layer.

In a second embodiment, a method and computer program product for use in a storage system comprising fracturing a cluster of an active/active storage system; wherein the cluster includes at least two sites, stopping IO on a first site of the cluster; and rolling to a point in time on the first site.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
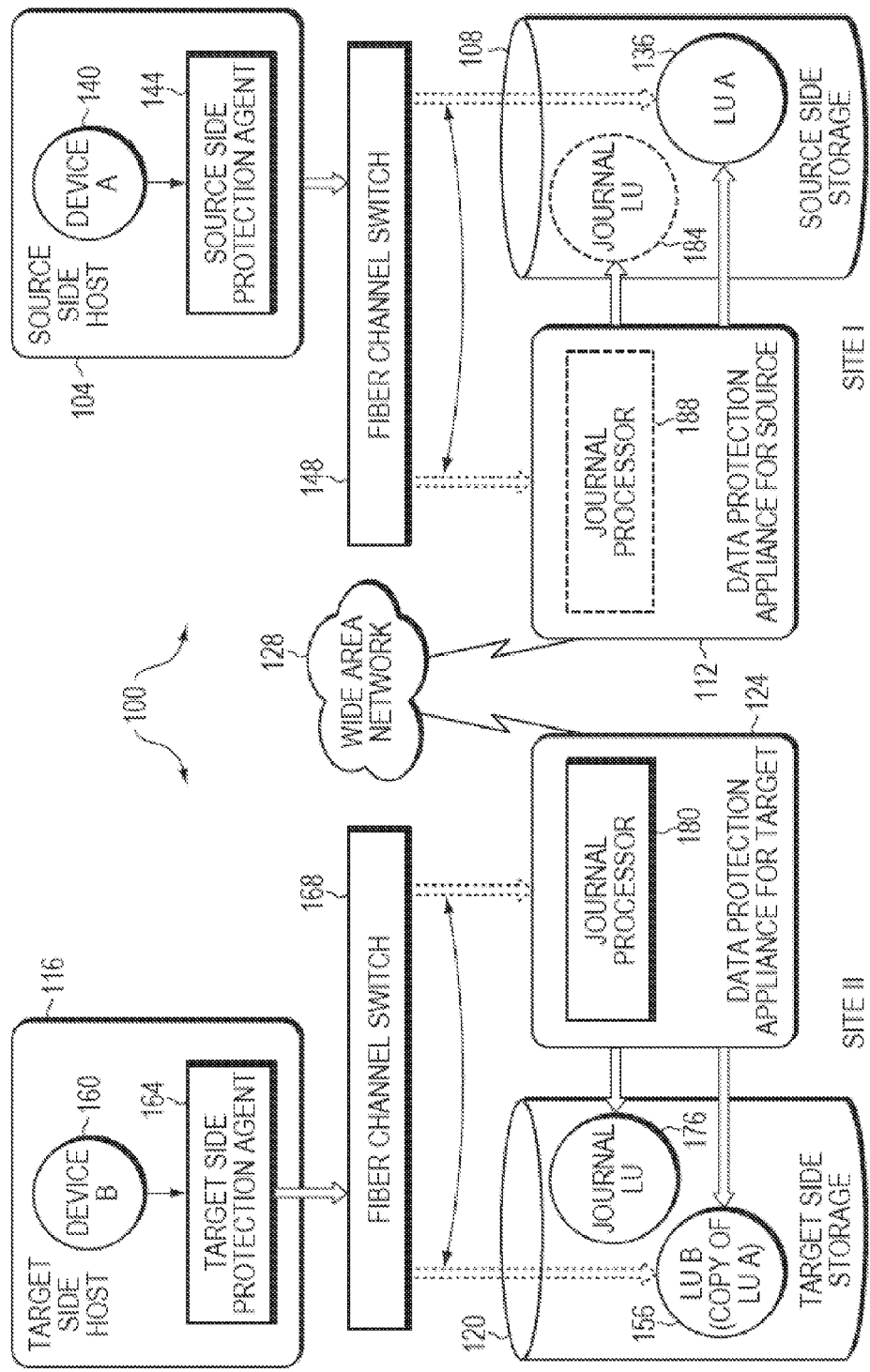
FIG. 1 is a simplified illustration of a data protection system, in accordance with an embodiment of the present invention.

In some embodiments of the instant disclosure, journal based replication may be integrated with a virtual service layer. In certain embodiments, one or more splitters may be integrated into the virtual service layer. In further embodiments, the virtual service lay may span multiple sites, and the sites may be at different geographic locations. In certain embodiments, each site may have one or more nodes and each node may have a splitter. In most embodiments, multiple sites linked via a virtual service layer may be referred to herein as an ACTIVE/ACTIVE storage system. In at least some embodiments, the virtual service layer may enable multiple sites to present the appearance of the same volume or virtual volume. In most embodiments, a host or virtual machine accessing any of the sites with the virtual volume may see the same data on the virtual volume as any other site. In further embodiments, each site may reserve a portion of the virtual volume for active access.

In some embodiments of the instant disclosure, access to point in time images may be enabled in a replicated environment. In some embodiments of the instant disclosure, access to point in time images may be enabled in an active/active storage system, for each of the sites. In at least some environments, the replicated environments may have a virtual service layer. In certain embodiments, an UNDO stream in a journal may be used to roll a site to a point in time (PIT). In most embodiments, each time a change set is to be pushed to a volume, the undo of the change set may be read and sent to a data protection appliance, and the change set may be written to the journal. In further embodiments, it may be enabled to access any change set as a point in time. In most embodiments, it is access to any point in time is enabled without having a second copy of the data.

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with patent number 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A discussion of journal based replication may be integrated with a virtual service layer. may be found in U.S. patent application Ser. Nos. 13/077,256, 13/077,262, and Ser. No. 13/077,266, entitled "CONSISTENT REPLICATION IN A GEOGRAPHICALLY DISPERSE ACTIVE ENVIRONMENT," "INVERSE STAR REPLICATION," and "NETWORKED BASED REPLICATION OF DISTRIBUTED VOLUMES," respectively, filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
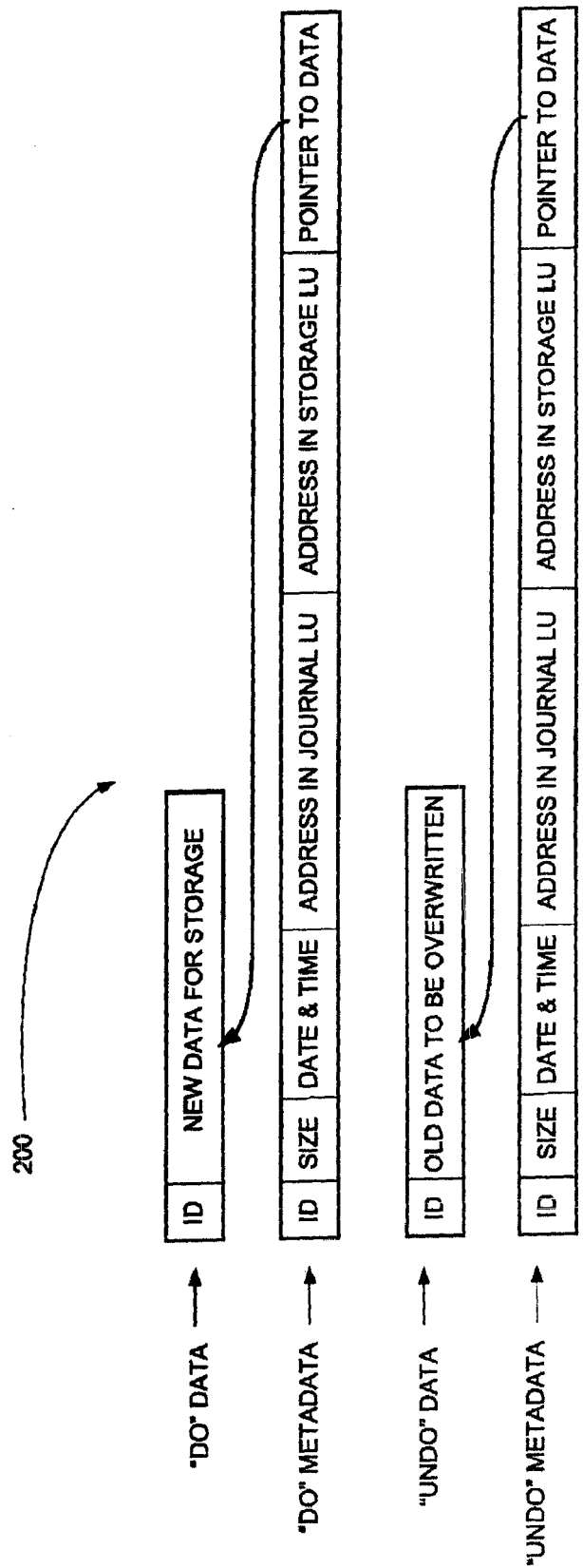
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Virtual Service Layer

Typical server environments have one or more hosts access storage. Conventionally, some of the hosts may be virtual hosts or virtual machines. Generally, each virtual machine or host has a LUN or logical unit corresponding to storage space it may access. Typically, this LUN corresponds to a portion of one or more physical disks mapped to the LUN or logical drive.

Conventional Server virtualization products may have developed the capability to execute migrations of virtual machines, the underlying storage, or both to address load balancing and high availability requirements with certain limitations. Typically, conventional solutions usually require disruptive failover (i.e. failure of one site to transfer the processes to the back-up site), merged SANs, and do not work with heterogeneous products. Thus, in typical systems, if a Virtual Machine were migrated to another environment, such as a server at another location outside of a site, the virtual machine would no longer have read write access to the LUN. However, it is desirable to be able to migrate a virtual machine and have it be able to have read write access to the underlying storage.

In certain embodiments of the instant disclosure, storage resources are enabled to be aggregated and virtualized to provide a dynamic storage infrastructure to complement the dynamic virtual server infrastructure. In an embodiment of the current invention, users are enabled to access a single copy of data at different geographical locations concurrently, enabling a transparent migration of running virtual machines between data centers. In some embodiments, this capability may enable for transparent load sharing between multiple sites while providing the flexibility of migrating workloads between sites in anticipation of planned events. In other embodiments, in case of an unplanned event that causes disruption of services at one of the data centers, the failed services maybe restarted at the surviving site with minimal effort while minimizing recovery time objective (RTO).

In some embodiments of the current techniques the IT infrastructure including servers, storage, and networks may be virtualized. In certain embodiments, resources may be presented as a uniform set of elements in the virtual environment. In other embodiments of the current techniques local and distributed federation is enabled which may allow transparent cooperation of physical data elements within a single site or two geographically separated sites. In some embodiments, the federation capabilities may enable collection of the heterogeneous data storage solutions at a physical site and present the storage as a pool of resources. In some embodiments, virtual storage is enabled to span multiple data centers In some embodiments, virtual storage or a virtual storage layer may have a front end and a back end. The back end may consume storage volumes and create virtual volumes from the consumed volumes. The virtual volumes may be made up of portions or concatenations of the consumed volumes. For example, the virtual volumes may stripped across the consumed volumes or may be made up of consumed volumes running a flavor of RAID. Usually, the front-end exposes these volumes to hosts.

An example embodiment of a virtual service layer or virtual service appliance is EMC Corporation's Vplex®. In some embodiments of the instant disclosure, a storage virtualization appliance has a back-end exposes LUNs to hosts and a front-end which talks to storage arrays, which may enable data mobility. In certain embodiments, storage may be added or removed from the virtual service layer transparently to the user In most embodiments, the virtual service layer enables cache coherency. Thus, in certain embodiments of the current techniques, the storage volumes, in a virtualized server environment, which comprise the encapsulation of a virtual machine may be coherently co-located in two sites, enabling simultaneous, local access by the virtual machine regardless of whether the virtual machine is located on the local or remote site. In other embodiments, cooperative clustering of the virtualization server nodes may allow for active/active, concurrent read/write access to one or more federated storage devices across the sites. In further embodiments, concurrent access may occur even if the data has not yet been fully copied between the two sites. In at least some embodiments of the current techniques, it is enabled to reference the source copy in this case, preserving seamless, continuous operation.

In certain embodiments of the current disclosure, movement of the virtual machines between the two sites is facilitated. In some embodiments, LUN level access is active/active, any single virtual machine may execute on only one node of the cluster. In further embodiments, enabling of migration of virtual machine instances may enable the migration of the I/O load (specifically read workloads) to storage devices located in the site where the active node resides for any given virtual machine.

In some embodiments of the current techniques, the ability to migrate a VM may be enabled through the use of one or more federated virtual volume. In certain embodiments, a virtual machine or application may communicate through a network with a module which presents virtual volumes to the application or virtual machine. In further embodiments the network may be a SAN. In at least some embodiments, this module may provide a level of abstraction between the storage and the requests for storage made by a virtual machine or other application. In these embodiments, the module may map the logical drive presented to the VM or application to the storage device. In certain embodiments, the module may be transparent to the storage request, the application or VM functioning as it is accessing a logical drive across a network. In other embodiments the network may be a SAN. In other embodiments, regardless of location of the VM, the VM may attempt to reach the LUN provided by the module, which may map the VM request to the appropriate storage.

In some embodiments of the current invention, a clustering architecture enables servers at multiple data centers to have concurrent read and write access to shared block storage devices. In alternative embodiments of the current invention, load sharing between multiple sites while providing the flexibility of migrating workloads between sites in anticipation of planned events such as hardware maintenance is enabled. In further embodiments, in case of an unplanned event that causes disruption of services at one of the data centers, the failed services may be quickly and easily restarted at the surviving site with minimal effort.

In most embodiments, the module may communicate with a second module at the second site to facilitate the one or more federated logical drive. In some embodiments, if a VM were to be moved from the first site to the second site the VM would attempt to access storage through the second module. In most embodiments, the move would be transparent to the VM as it would simply reach out to access the storage and the module on the second site would re-direct the request to the storage on the second site. In some embodiments, the module on the second site would direct the request to the data on the second site. In some embodiments, the storage may be kept in sync using a minor, the VM may access a current version of the data, regardless of on which site the VM is located. The modules at the first and second site may be in communication with each other.

In some embodiments, disparate storage arrays at two separate locations may be enabled to appear as a single, shared array to application hosts, allowing for the easy migration and planned relocation of application servers and application data, whether physical or virtual. In other embodiments, effective information distribution by sharing and pooling storage resources across multiple hosts may enabled. In further embodiments, manage of virtual environment may be enabled to transparently share and balance resources across physical data centers, ensure instant, realtime data access for remote users, increase protection to reduce unplanned application outages, and transparently share and balance resources within and across physical data centers.

In further embodiments, concurrent read and write access to data by multiple hosts across two locations may be enabled. In other embodiments, realtime data access to remote physical data centers without local storage may be enabled. In some embodiments, the virtual service layer may be implemented by EMC's VPLEX or the like.

Figure 3:
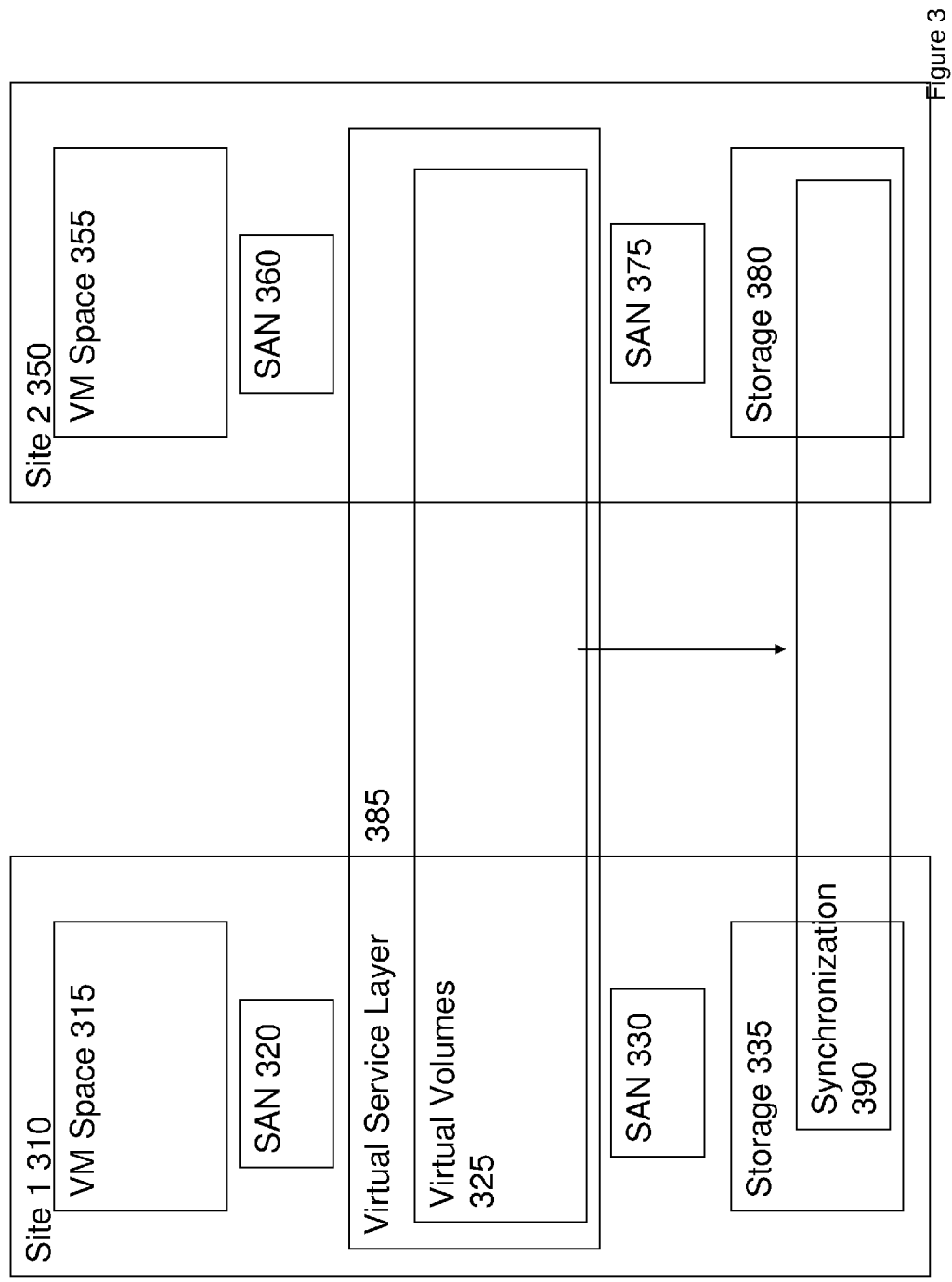
FIG. 3 is a simplified illustration of sites with a virtual service layer, in accordance with an embodiment of the present invention.

Refer to the example embodiment of a virtual service layer of FIG. 3. In the embodiment of FIG. 3, there are two sites 310, 350. Each site has a respective VM space or a space able to run virtual machine, 315, 355, SANs, 320, 330, 360, and 375 and storage 335, 380, respectively. The two sites also have a virtual service later 385, which presents virtual volumes 325. The synchronization 390 of the storage 335 is provided by the virtual service layer 385. In the embodiment of FIG. 3, the same virtual volume may be exposed via the virtual service layer 385. This volume may be kept synchronized so that any VM in VM Space 315 or VM in VM Space 355 accesses the same virtual volume with the same data regardless of in which VM Space, 315, 355, the VM resides.

In some embodiments of the current disclosure, replication and data mobility may be enabled at difference geographic sites. In certain embodiments, this may be enabled by cache coherency functionality. In at least some embodiments, the cache coherency may enable data to be consistent over large distances and be able to be accessed at both geo sites. In a particular embodiment, there may be two geo sites. In this embodiment, if a read is performed on an area of the storage that does not belong to the local site, the read may be delayed and the read may be performed on the remote site. In this embodiment, if a read is performed on an area owned by the local site, then the read may be performed on the local site.

In other embodiments, the geo sites may enforce a write order fidelity mechanism (WOFM) by periodically quiescing or stopping the storage and ensure that the replicated data is consistent. In these embodiments, a checkpoint may be created at each site. This checkpoint may be transmitted to the other site. The other site may flush this checkpoint in order to ensure it has the data as the other site. In these embodiments, only consistent data may be written to the other site. In these embodiments, if a site crashes, then both sites are ensured to have a point in time, where both sites have the same data.

A discussion of some types of virtual storage may be found in U.S. Pat. No. 7,206,863, entitled "SYSTEM AND METHOD FOR MANAGING STORAGE NETWORKS AND PROVIDING VIRTUALIZATION OF RESOURCES IN SUCH A NETWORK" issued on Apr. 17, 2007, to EMC Corp, U.S. Pat. No. 7,770,059, entitled "FAILURE PROTECTION IN AN ENVIRONMENT INCLUDING VIRTUALIZATION OF NETWORKED STORAGE RESOURCES" issued on Aug. 3, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK" issued on Jun. 15, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK USING ONE OR MORE ASICS" issued on Nov. 17, 2009, to EMC Corp, U.S. Pat. No. 7,620,774, entitled "SYSTEM AND METHOD FOR MANAGING STORAGE NETWORKS AND PROVIDING VIRTUALIZATION OF RESOURCES IN SUCH A NETWORK USING ONE OR MORE CONTROL PATH CONTROLLERS WITH AN EMBEDDED ASIC ON EACH CONTROLLER" issued on Nov. 17, 2009, to EMC Corp, U.S. Pat. No. 7,225,317, entitled "SYSTEM AND METHOD FOR MANAGING STORAGE NETWORKS AND FOR MANAGING SCALABILITY OF VOLUMES IN SUCH A NETWORK" issued on May 29, 2007, to EMC Corp, U.S. Pat. No. 7,315,914, entitled "SYSTEMS AND METHODS FOR MANAGING VIRTUALIZED LOGICAL UNITS USING VENDOR SPECIFIC STORAGE ARRAY COMMANDS" issued on Jan. 1, 2008, to EMC Corp, and U.S. Pat. No. 7,216,264, entitled "SYSTEM AND METHOD FOR MANAGING STORAGE NETWORKS AND FOR HANDLING ERRORS IN SUCH A NETWORK" issued on May 8, 2007, to EMC Corp, all of which are hereby incorporated by reference. A discussion of mirroring may be found in U.S. Pat. No. 7,346,805, entitled "PROTECTION OF MIRRORED DATA" issued on Mar. 18, 2008 to EMC Corp, which is hereby incorporated by reference.

Journal Based Replication with Point in Time Access

In most embodiments, each site of a geographically separated active/active storage cluster of sites may have a write cache; the cache may be used to maintain write order fidelity. In most embodiments, each site may reserve a portion of a volume, so that other sites may not be able to write to the reserved portion of the volume, unless the site requests a reservation to this portion of the volume. In certain embodiments, the write cache may contain the changes that occur to the reserved portions of the volume.

In some embodiments, the write order fidelity mechanism may periodically quiesce both sites and may create a consistency check point or a change set. In certain embodiments, the data from the caches of each site may be asynchronously transferred to a replica site. In most embodiments, the change set data may periodically be flushed on the backend storage to enable the backend storage has a consistent point. In at least some embodiments, before a change set is flushed the system may read the undo of the change set and send it to a replication appliance (which may be a physical or virtual appliance or run as a process inside the cluster or sites). In some embodiments, the appliance may write the data to an undo journal and the system may flush the data to the backend storage.

In some embodiments of the instant disclosure, the sites or cluster of sites may be fractured or broken. In certain embodiments, this may enable active production to occur on one of the sites while enabling a second site to be rolled to a point in time (PIT). In at least some embodiments, this may enable a user to examine and use a PIT while active production may be occurring on another site.

Figure 4:
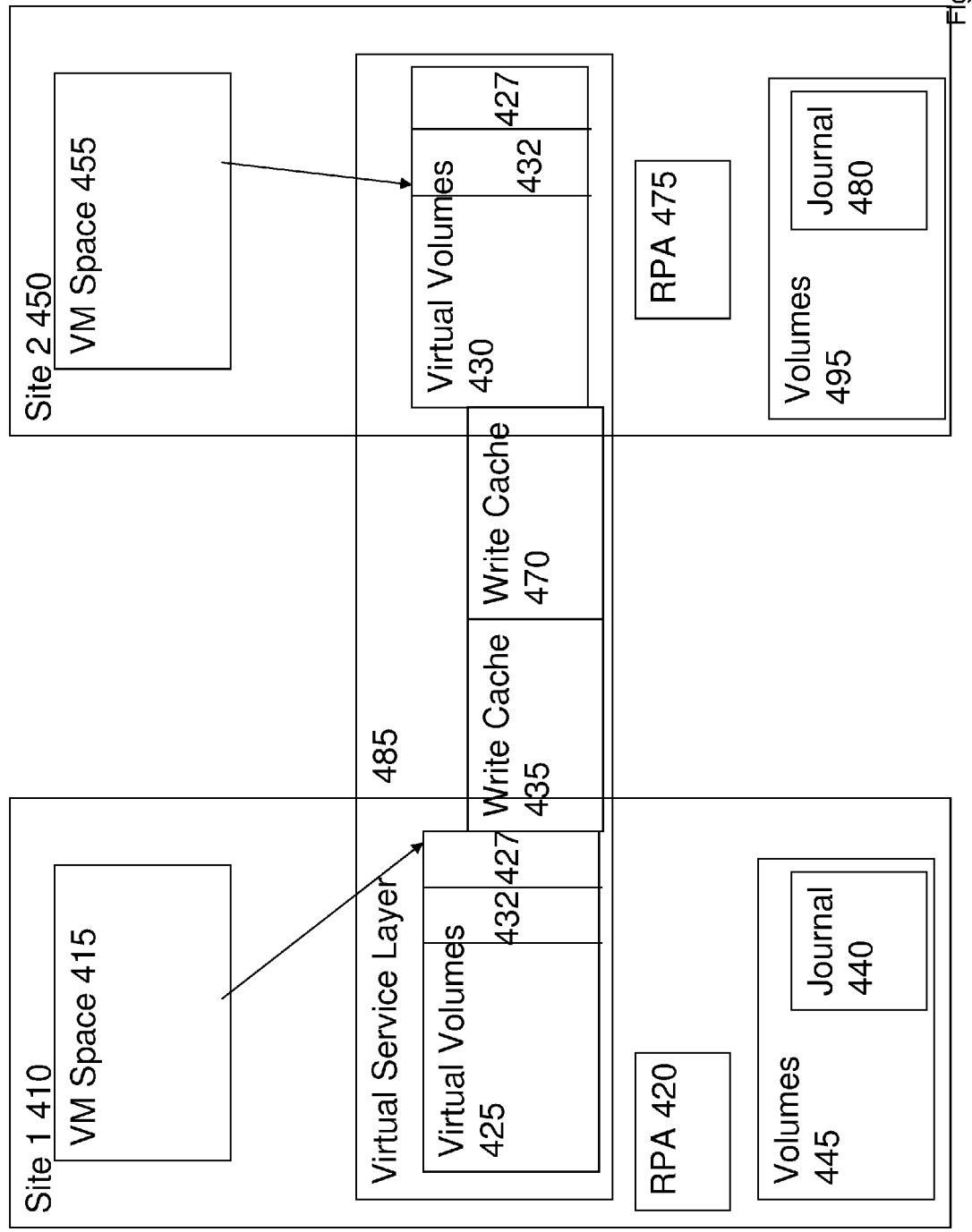
FIG. 4 is a simplified illustration of sites with a virtual service layer with write caches, in accordance with an embodiment of the present invention.

Refer now to the example embodiment of FIG. 4. In the example embodiment of FIG. 4, there are two sites, site 419 and site 450. In this example, Site 410 and site 450 each have a VM space 415, 455. In this embodiment, the VM spaces 415 and 455 have reserved a portion of virtual volumes 425 and 430 which part of virtual service layer 485. In this embodiment VM space 415 has reserved portion 427 of volume 425 and VM space 455 has reserved portion 432 of Virtual Volume 430. As noted herein, the virtual volumes 425 and 430 appear to the VM Spaces 415 and 455 to be the same volume. In FIG. 4, each site also has a Replication Protection Appliance, 420 and 475 respectively, a journal, 440 and 480 respectively, and Write Cache 435 and 470 respectively.

Figure 5:
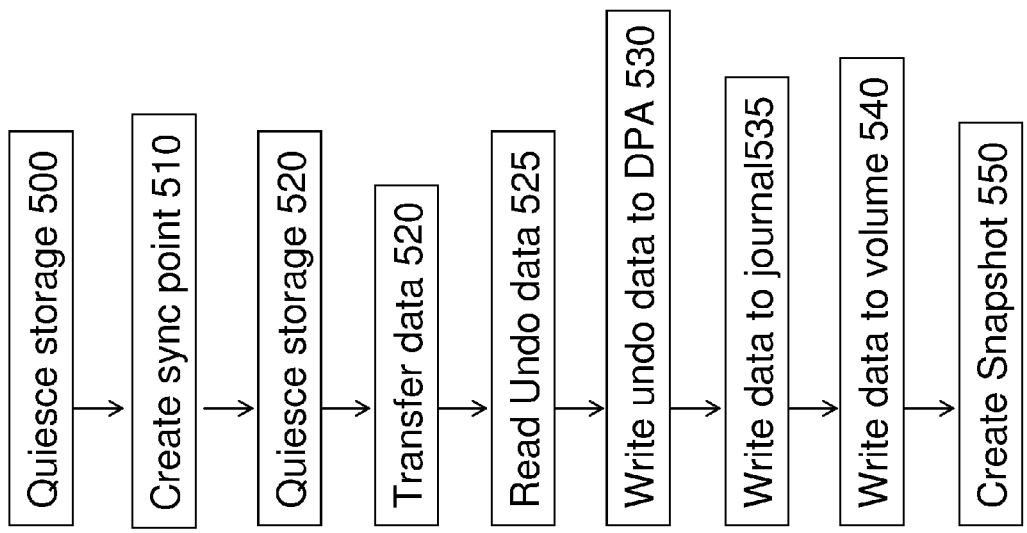
FIG. 5 is a simplified example of an embodiment of a method for creating a snapshot for the two sites, in accordance with an embodiment of the present disclosure.
Figure 6:
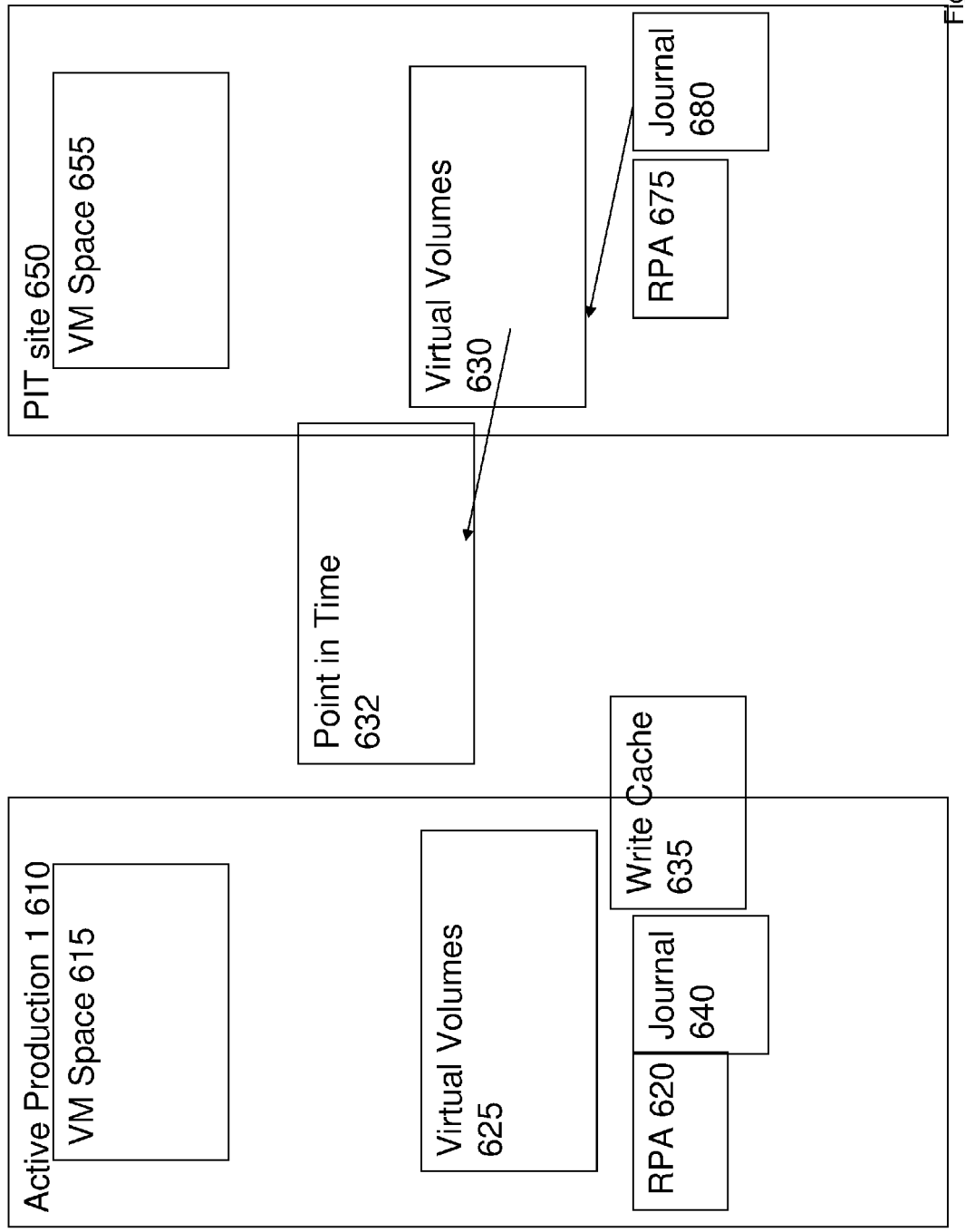
FIG. 6 is an alternative simplified illustration of sites with write caches illustrating Point in Time access, in accordance with an embodiment of the present invention.

Refer now to the example embodiments of FIG. 5 and FIG. 6. The example embodiments of FIGS. 5 and 6 illustrate creating any point in time journal at each site. Periodically the storage on sites 410 and 450 is quiesced (step 500). A synchronization point i.e. a change set is created (step 510), and storage may be un-quiesced. The write cache data, 435 and 470, is transferred to the other sites (step 520). In some embodiments, the write cache may be transferred asynchronously. When a change set is to be flushed to the backend storage, the undo data for the change set is read from backend storage (at each of the sites) (step 525). The undo data is written to the RPAs 420 and 475 (step 530), each RPA 420, 475 writes the undo data to the journals 440 and 480. The data in the write caches 435 and 470, respectively, is written to the volumes (step 540). Once the change set is flushed the RPA is indicated a change set flush is completed and the DPA create a snapshot i.e. a consistent point in time that the user will be allowed to access (step 550).

Figure 7:
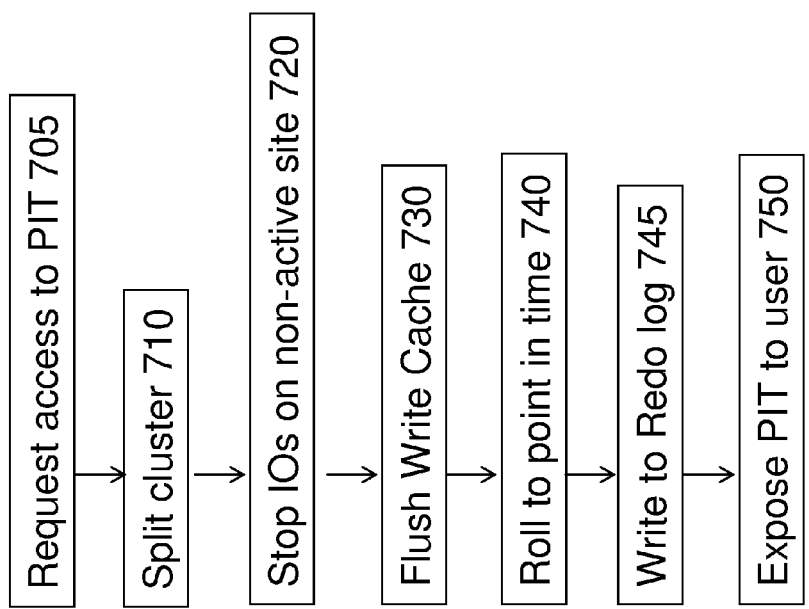
FIG. 7 is a simplified example of an embodiment of a method for accessing a Point in Time, in accordance with an embodiment of the present disclosure.

Refer now to the example embodiments of FIGS. 6 and 7, which illustrate a user examining previous point in time (PIT). In certain embodiments, the user may seek to restore a corrupted file. In other embodiments, the user may seek to restore the whole system to a previous PIT. In further embodiments, the user may want to perform tests on a previous PIT. The user request access to a specific point in time (705), The cluster or sites 610 and 650 are split (step 710). The IOs are stopped on the non-active site, in this embodiment site 650 (Step 720). The IOs in the write caches 635 and 670 are flushed to the volumes 625 and 630 (Step 730). The non-active site, 650, is rolled to point in time (PIT) 632 (Step 740). In certain embodiments, when rolling the data from the undo log is read, the redo for the undo data may be read from the volume, may be written to a redo log, and the undo data may be applied to the volume. PIT 632 is exposed to a user (Step 750). In most embodiments, the user may now test the data at the non active site and IOs may continue to flow to the active site. In most embodiments, the storage is an active/active storage where both sites may expose the logical unit with the same identity, when the data is exposed to the user in a test mode, the system may expose the logical unit of the different point in time with a different SCSI identity.

Figure 8:
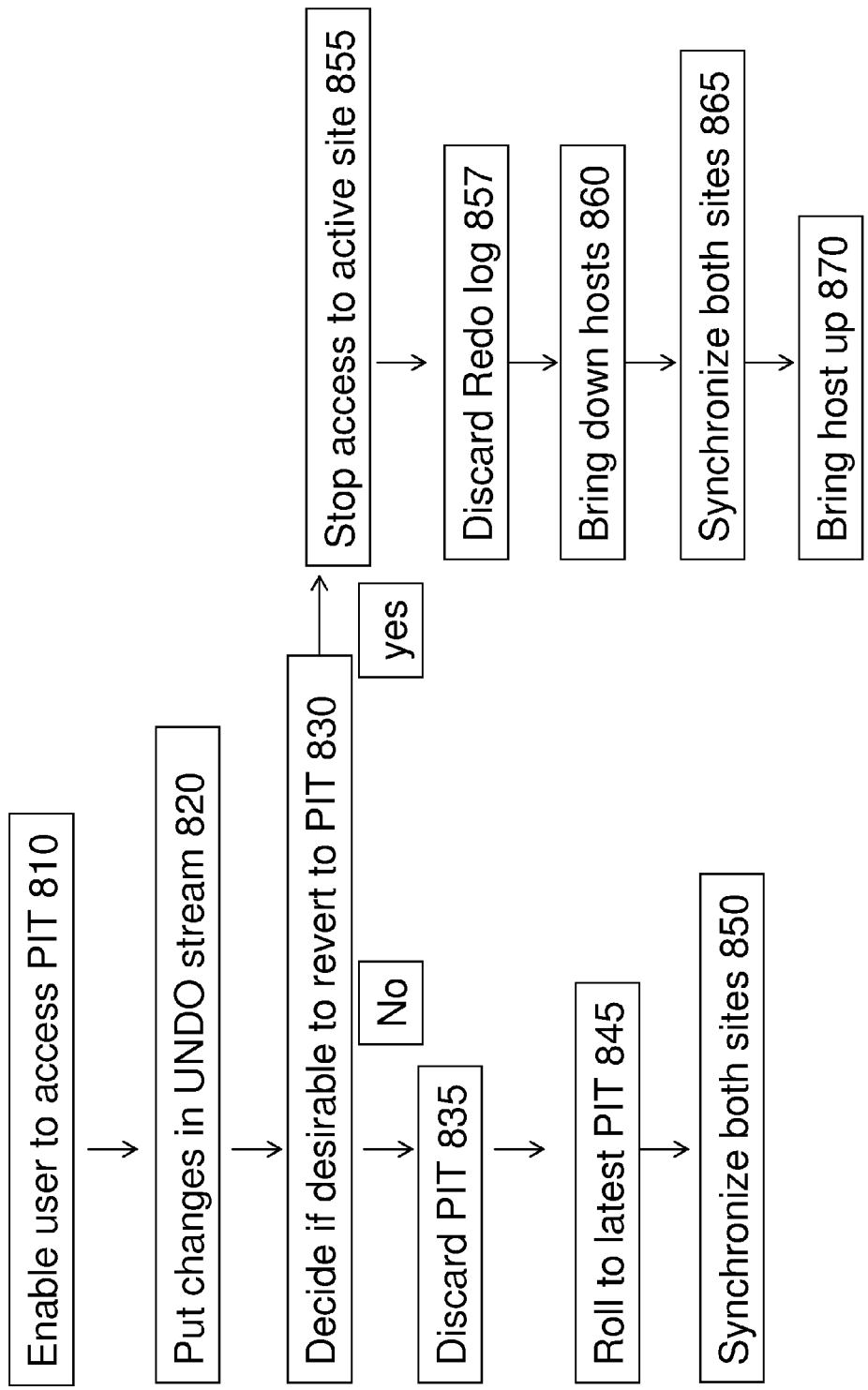
FIG. 8 is a simplified example of an embodiment of a method for synching an image across two sites, in accordance with an embodiment of the present disclosure.

Refer now to the example embodiments of FIGS. 6 and 8. The user is enabled to access the PIT 632 (step 810) and is enabled to read and write from the image. Changes to the PIT 632 are written to the UNDO stream in journal 680 (step 820). A decision is made if it is desirable to revert to the PIT 632 of volume 630 to the active site or to continue with the current image of volume 625 on active site 610, i.e. discard the changes made to PIT 632 and make the two (or more) sites active/active again. If the decision is made to keep the current image of volume 625 on active site 610, changes made while accessing PIT 632 are discarded (step 835) by rolling the undo stream to original data of point in time 632. In most embodiments, during this roll no redo data may be written because it is desired to discard the changes made. In most embodiments, the image of volume 630 is rolled to the latest PIT in journal 680 (step 845) by reading the data in the redo log, reading the undo of the redo data from volume 630, writing the undo data to the undo stream and writing the redo data to volume 630. The sites 610, 650 are synchronized (step 850). In certain embodiments, the synchronization may be performed by the virtualization layer, which may track the changes that happened in the active site, and the virtualization may discard the changes which happened on site 650 since the changes where reverted. If a decision is made to access the selected point 632 in time access to the active site 610 is stopped (step 855). The redo log is discarded (step 857). The hosts, in this embodiment, are virtual machines in VM space 615, are brought down (i.e. stopped from accessing the volumes) (step 860). Both sites 610 and 650 are synchronized using the changes tracked by the virtualization layer (step 865). The hosts in VM spaces 615, 655, are brought up (step 870).

In most embodiments, when the sites are being synchronized undo for all IO operations to the virtualization layer may be written to the undo logs. In at least some embodiments, new snapshots may not be created on the site which the data is being updated. In certain embodiment, if the data of PIT 632 was to be kept, until synchronization of this PIT finished, new snapshots may not be created in site 610. In other embodiments, if the data of site 610 was kept, no new snapshots may be created at site 650 until initialization ends. In most embodiments, there may be no new snapshots is that until the sites are synched, the data may not be in a consistent state.

Figure 9:
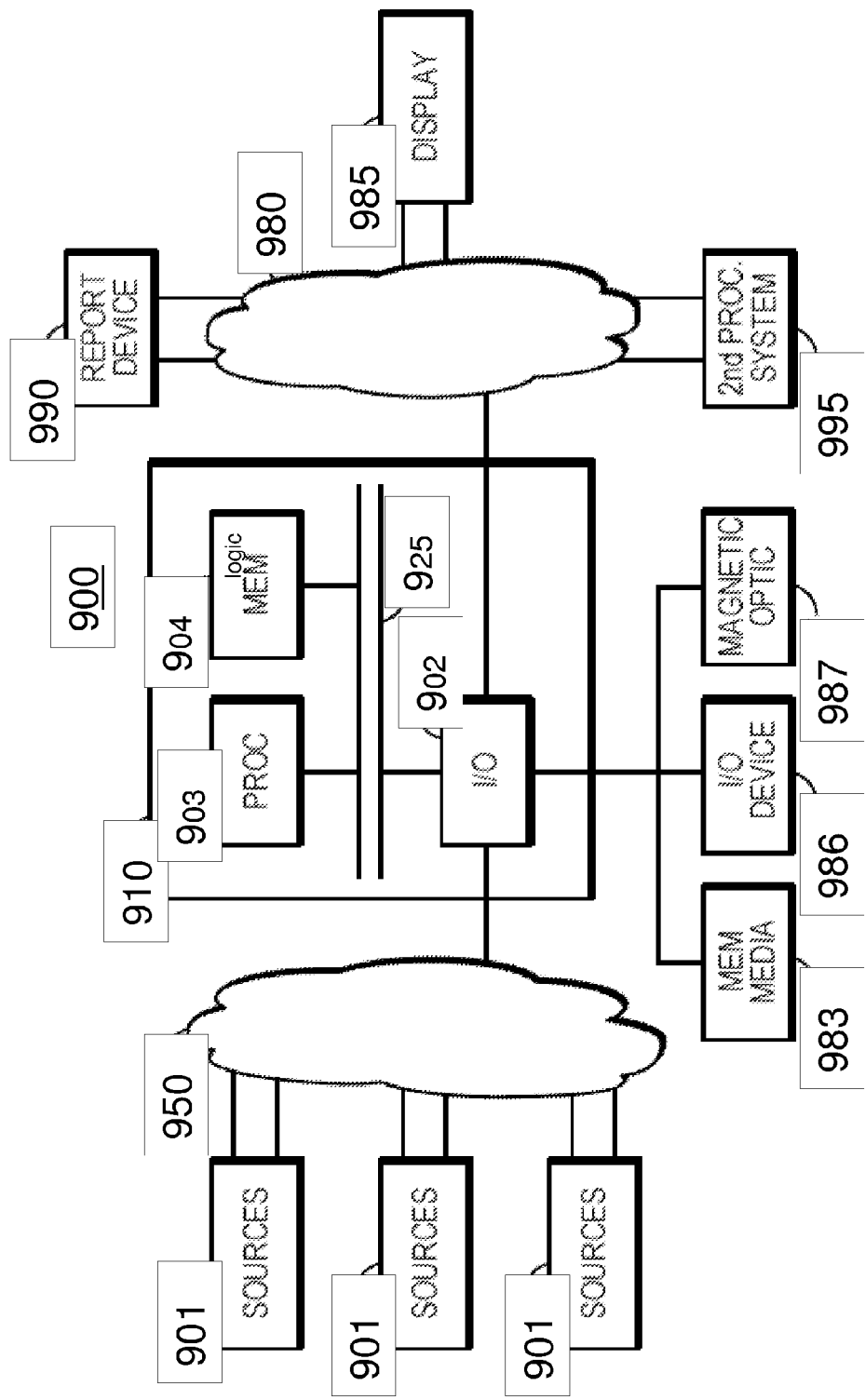
FIG. 9 is an example of an embodiment of an apparatus that may utilize the techniques described herein, in accordance with an embodiment of the present invention.
Figure 10:
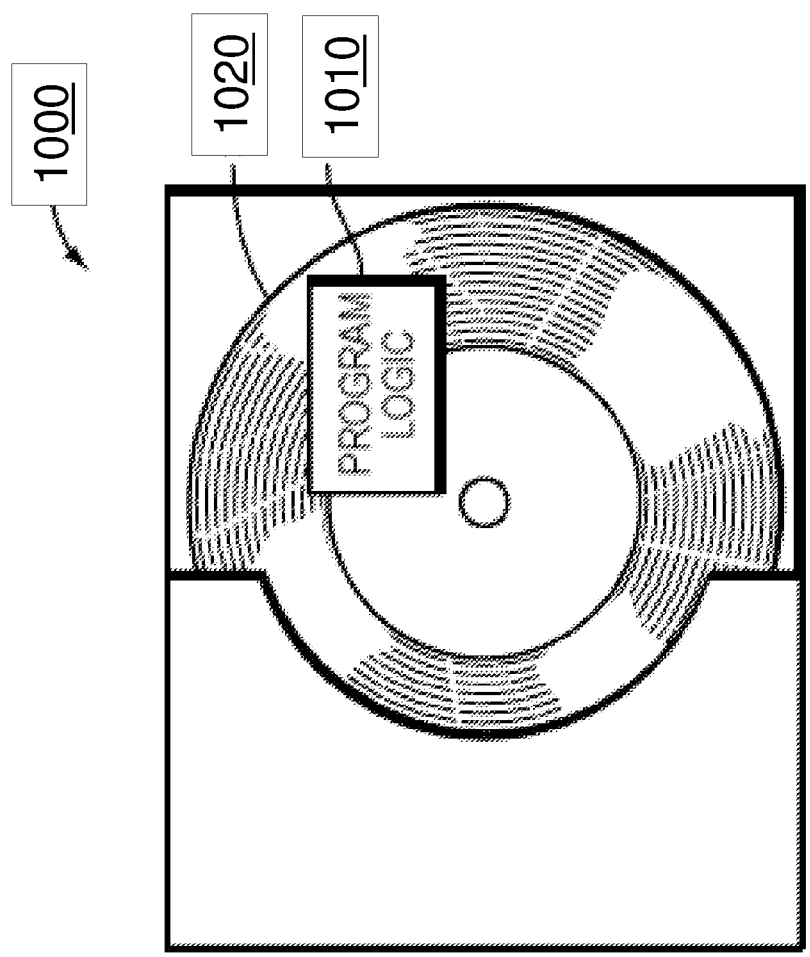
FIG. 10 is an example of an embodiment of a method embodied on a computer readable storage medium that may

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor 903 to provide a unique apparatus that operates analogously to specific logic circuits. As such a general purpose digital machine can be transformed into a special purpose digital machine. FIG. 10 shows Program Logic 1034 embodied on a computer-readable medium 1030 as shown, and wherein the Logic is encoded in computer-executable code configured for carrying out the reservation service process of this invention and thereby forming a Computer Program Product 1000. The logic 1034 may be the same logic 940 on memory 904 loaded on processor 903. The program logic may also be embodied in software modules, as modules, or as hardware modules.

The logic for carrying out the method may be embodied as part of the system described below, which is useful for carrying out a method described with reference to embodiments shown in, for example, FIG. 5 and FIG. 7. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer program product for use in replication comprising:
   a non-transitory computer readable medium encoded with computer executable program code for replication of data, the code configured to enable the execution of:
   quiescing IO commands to sites of an ACTIVE/ACTIVE storage system, the active/active storage system having at least two storage sites communicatively coupled via a virtualization layer; wherein the virtualization layer enables the at least two storage sites to present a same virtual volume at each of the at least two storage sites enabling transparent migration of a virtual machine between the at least two storage sites; wherein the virtualization layer enables cache coherency between each of the at least two storage sited; wherein the virtualization layer enables simultaneous, active/active, concurrent read/write access to the same virtual volume at both of the sites;
   creating a change set for the same virtual volume;
   unquiescing IO commands to the sites;
   transferring data of the change set to the other sites of the active/active storage system by the virtualization layer, and
   flushing the data to the sites; wherein flushing of the data of the change set enables the other sites of the at least two storage sites to synchronize changed data of the site from which the change set was transferred enabling the at least two storage sites to have a point in time with the same data.

2. The code of claim 1 wherein the flushing comprises:
   reading, by the virtualization layer, an undo of the data to be flushed in the change set;
   writing the undo data corresponding to the data in the write cache to a data protection appliance (DPA);
   writing, by the DPA, the undo data to a journal; and
   writing the data to the backend storage system by the virtualization layer.

3. The code of claim 2 where the DPA is a virtual machine; and the code further enables:
   writing the data from the write cache to a volume;
   notifying the DPA a full change set has been flushed; and
   creating a bookmark at the undo journal by the DPA.

4. the code of claim 1 for use in replication enabling:
   a non-transitory computer readable medium encoded with computer executable program code for replication of data, the code configured to enable the execution of:
   fracturing a cluster of an active/active storage system; wherein the cluster includes at least two sites; wherein an active/active storage system that is not fractured includes a virtualization layer that enables the at least two storage sites to present a same virtual volume at each of the at least two storage sites enabling transparent migration of a virtual machine between the at least two storage sites; wherein the virtualization layer enables simultaneous, active/active, concurrent read/write access to the same virtual volume at both of the sites;
   wherein the virtualization layer enables cache coherency between each of the at least two storage sited;
   wherein a fractured active/active storage system enables an image on a first site of the sites to be rolled to a point in time and enables active production on a second site of the sites;
   stopping IO on a first site of the cluster; and
   rolling to a point in time on a first site of the cluster that is consistent with at least a second site of the cluster before the at least two sites were fractured.

5. The code of claim 4 further enabling:
   flushing a write cache on a second site of the cluster to the first site of the cluster.

6. The code of claim 4 further enabling:
   requesting, by a user, access to a point in time;
   writing undo information generated by rolling to the point in time to a redo log;
   exposing the point in time to the user;
   enabling the user to access the point in time data; and
   storing changes to the point in time in an undo stream.

7. The code of claim 4 further enabling:
   determining to revert to the point in time; and
   based on a positive determination stopping access to the second site, discarding the redo log on the first site, making the sites not fractured, synchronizing the sites to the point in time and allowing access to the second site.

8. The code of claim 7 further enabling:
   based on a negative determination, stopping access to the first site discarding the changes made at point in time, rolling the first site to the latest point in time using the redo log, making the sites not fractured and synchronizing both sites to an image on the second site, and restoring access to the first site.

9. The code of claim 6 further enabling exposing the point in time to the user, where in the logical unit identity is different than the original logical unit identity.

10. The code of claim 9 further enabling: shutting down hosts on second site, before stopping access, and restarting hosts when access restored.

11. A computer implemented method use in replication, comprising:
    quiescing IO commands to sites of an ACTIVE/ACTIVE storage system, the active/active storage system having at least two storage sites communicatively coupled via a virtualization layer; wherein the virtualization layer virtual service layer enables the at least two storage sites to present a same virtual volume at each of the at least two storage sites enabling transparent migration of a virtual machine between the at least two storage sites; wherein the virtualization layer enables simultaneous, active/active, concurrent read/write access to the same virtual volume at both of the sites; wherein the virtualization layer enables cache coherency between each of the at least two storage sited;
    creating a change set for the same virtual volume;
    unquiescing IO commands to the sites;
    transferring data of a change set to the other sites of the active/active storage system by the virtualization layer, and
    flushing the data; wherein flushing of the data of the change set enables the other sites of the at least two storage sites to synchronize changed data of the site from which the change set was transferred enabling the at least two storage sites to have a point in time with the same data.

12. The method of claim 11 further comprising:
    reading, by the virtualization layer, the undo of the data to be flushed, writing undo data corresponding to the data in the write cache to a data protection appliance (DPA);

writing, by the DPA, the undo data to a journal; and writing the data to the backend storage system by the virtualization layer.

13. The method of claim 11 where the DPA is virtual machine and the method further comprising:

writing the data from the write cache to a volume;

notifying the DPA a full change set has been flushed; and creating a bookmark at the undo journal by the DPA.

14. the code of claim 4 further comprising:

fracturing a cluster of an active/active storage system; wherein the cluster includes at least two sites; wherein an active/active storage system that is not fractured includes a virtualization layer enables the at least two storage sites to present a same virtual volume at each of the at least two storage sites enabling transparent migration of a virtual machine between the at least two storage sites; wherein the virtualization layer enables simultaneous, active/active, concurrent read/write access to the same virtual volume at both of the sites; wherein the virtualization layer enables cache coherency between each of the at least two storage sited; wherein a fractured active/active storage system enables an image on a first site of the sites to be rolled to a point in time and enables active production on a second site of the sites;

stopping IO on a first site of the cluster; and rolling to a point in time on a first site of the cluster that is consistent with at least a second site of the cluster before the at least two sites were fractured.

15. The computer implemented method of claim 14 further comprising:

flushing the a write cache on a second site of the cluster to the first site of the cluster.

16. The computer implemented method of claim 14 further comprising:

requesting, by a user, access to a point in time;

writing undo information generated by rolling to the point in time to a redo log;

exposing the point in time to the user;

enabling the user to access the point in time data; and storing changes to the point in time in an undo stream.

17. The computer implemented method of claim 14 further comprising:

determining to revert to the point in time; and based on a positive determination stopping access to the second site, discarding the redo log on the first site, un-fracturing the sites by unfracturing the virtualization layer, synchronizing sites to the point in time and allowing access to the second site.

18. The computer implemented method of claim 17 further comprising:

based on a negative determination, stopping access to the first site discarding changes made at the point in time, rolling the first site to the latest point in time using the redo log, making the sites not fractured by connecting the virtualization layer and synchronizing both sites to an image on the second site, and restoring access to the first site.

19. The computer implemented method of claim 16 further comprising:

exposing the point in time to the user, where in the logical unit identity is different than the original logical unit identity.

20. The computer implemented method of claim 14 further comprising:

shutting down hosts on second site, before stopping access, and restarting hosts when access restored.

* * * * *